United States Patent
Kim

(10) Patent No.: US 8,936,868 B2
(45) Date of Patent: Jan. 20, 2015

(54) RECHARGEABLE BATTERY

(75) Inventor: Changseob Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 321 days.

(21) Appl. No.: 13/212,968

(22) Filed: Aug. 18, 2011

(65) Prior Publication Data

US 2012/0052373 A1    Mar. 1, 2012

(30) Foreign Application Priority Data

Aug. 24, 2010    (KR) .................... 10-2010-0082114

(51) Int. Cl.
*H01M 2/06*    (2006.01)
*H01M 2/30*    (2006.01)

(52) U.S. Cl.
CPC ...... *H01M 2/30* (2013.01); *H01M 2/06* (2013.01); *H01M 2200/101* (2013.01); *H01M 2200/103* (2013.01); *H01M 2200/106* (2013.01)
USPC ........................................................ 429/179

(58) Field of Classification Search
None
See application file for complete search history.

(56) References Cited

U.S. PATENT DOCUMENTS

| | | | |
|---|---|---|---|
| 6,174,618 B1 * | 1/2001 | Nishiyama et al. | 429/99 |
| 2004/0096732 A1 | 5/2004 | Shin et al. | |
| 2004/0170887 A1 * | 9/2004 | Masumoto et al. | 429/61 |
| 2004/0228061 A1 | 11/2004 | Kim et al. | |
| 2005/0221176 A1 | 10/2005 | Kim | |
| 2006/0073375 A1 * | 4/2006 | Hong et al. | 429/53 |
| 2009/0269620 A1 * | 10/2009 | Kim | 429/7 |

FOREIGN PATENT DOCUMENTS

| | | |
|---|---|---|
| CN | 1519963 A | 8/2004 |
| CN | 1319189 C | 5/2007 |
| EP | 2 112 704 A1 | 10/2009 |
| JP | 2003-051304 A | 2/2003 |
| JP | 2003-257386 A | 9/2003 |
| JP | 2004-022478 A | 1/2004 |
| JP | 2004-172085 A | 6/2004 |
| JP | 2005-285758 A | 10/2005 |
| KR | 2004-0043041 A | 5/2004 |
| KR | 10-2005-0110504 A | 11/2005 |

(Continued)

OTHER PUBLICATIONS

Machine English Translation of JP2003-051304A, Patent Abstracts of Japan, 19 pages.

(Continued)

*Primary Examiner* — Patrick Ryan
*Assistant Examiner* — Wyatt McConnell
(74) *Attorney, Agent, or Firm* — Christie, Parker & Hale, LLP

(57) ABSTRACT

A rechargeable battery is provided, which can prevent incompatibility of rechargeable batteries with existing charging/discharging equipment by extending an electrode terminal to the center of a cap plate. In one exemplary embodiment, the rechargeable battery includes an electrode assembly including a positive electrode tab and a negative electrode tab, a can accommodating the electrode assembly, a cap plate sealing a top opening of the can and having a terminal through-hole at a first location offset toward one side of the cap plate with respect to the center of the cap plate, and an electrode terminal inserted into the terminal through-hole, wherein the electrode terminal extends along a top surface of the cap plate from the first location to the center of the cap plate.

15 Claims, 6 Drawing Sheets

(56) References Cited

FOREIGN PATENT DOCUMENTS

| KR | 10-2006-0112743 A | 11/2006 |
| KR | 10-2008-0038662 A | 5/2008 |

OTHER PUBLICATIONS

Machine English Translation of JP2003-257386A, Patent Abstracts of Japan, 6 pages.

Machine English Translation of JP2004-022478A, Patent Abstracts of Japan, 8 pages.

SIPO Office action dated Sep. 27, 2013, for corresponding Chinese Patent application 201110186359.9, (5 pages).

EPO Search Report dated Mar. 27, 2014, for corresponding European Patent application 11250483.2, (4 pages).

* cited by examiner

RECHARGEABLE BATTERY

CROSS-REFERENCE TO RELATED APPLICATION

This application claims priority to and the benefit of Korean Patent Application No. 10-2010-0082114, filed on Aug. 24, 2010 in the Korean Intellectual Property Office, the entire content of which is incorporated herein by reference.

BACKGROUND

1. Field

Aspects of embodiments according to the present invention relate to a rechargeable battery.

2. Description of Related Art

An exemplary lithium-ion battery includes a protective device, such as a positive temperature coefficient (PTC) device or a thermal fuse for protecting a temperature rise when the internal temperature of a battery abnormally increases due to an abnormality of the battery. The protective device may be positioned outside the battery. In such a case, however, the sensitivity of detecting heat generated inside the battery may be lowered. To overcome this, a structure in which a protective device that can be inserted into a battery has been developed.

In order to facilitate installation of the protective device, a structure for shifting a position of an electrode terminal from the center to a side of the battery has been proposed. However, when a large-capacity battery is accommodated in a battery tray and undergoes charge/discharge processes, such a shift in position of the electrode terminal (to accommodate the protective device) may make it difficult to utilize existing charge/discharge equipment. This is because existing charge/discharge equipment may be configured to provide a charge/discharge plug on an electrode terminal positioned at the center of a cap plate of the battery. Accordingly, this may lead to undesirably lowering compatibility of rechargeable batteries with existing charge/discharge equipment.

SUMMARY

To address the aforementioned problems, aspects of embodiments according to the present invention provide a rechargeable battery that is compatible with existing charging/discharging equipment while forming an electrode terminal at a location biased (for example, offset) toward one side of the center of a top surface of a cap plate.

According to an exemplary embodiment of the present invention, a rechargeable battery is provided. The rechargeable battery includes an electrode assembly including a positive electrode tab and a negative electrode tab, a can accommodating the electrode assembly, a cap plate sealing a top opening of the can and having a terminal through-hole at a first location offset toward one side of the cap plate with respect to a center of the cap plate, and an electrode terminal inserted into the terminal through-hole. The electrode terminal extends along a top surface of the cap plate from the first location to the center of the cap plate.

The electrode terminal may include a head portion extending along the top surface of the cap plate and a pillar portion inserted into the terminal through-hole. The head portion may extend past the center of the cap plate.

The rechargeable battery may further include a terminal plate below the first location and electrically connected to the electrode terminal, and an insulation plate between a bottom surface of the cap plate and the terminal plate.

The rechargeable battery may further include a protective device attached to a bottom surface of the insulation plate, where one side of the protective device is electrically connected to the terminal plate by a first connection tab, and another side of the protective device is electrically connected to the negative electrode tab by a second connection tab.

The rechargeable battery may further include a heat blocking plate between the insulation plate and the protective device.

The rechargeable battery may further include a second insulation plate on the bottom surface of the cap plate and a second terminal plate on a bottom surface of the second insulation plate. The second insulation plate is below a second location of the cap plate, the second location being offset toward an other side of the cap plate with respect to the center of the cap plate, the center of the cap plate being between the first location and the second location.

The rechargeable battery may further include a protective device on the bottom surface of the second insulation plate, where one side of the protective device is electrically connected to the bottom surface of the cap plate by a first connection tab, an other side of the protective device is electrically connected to the second terminal plate by a second connection tab, and the second terminal plate is electrically connected to the positive electrode tab.

The rechargeable battery may further include an insulation plate below the first location and on a bottom surface of the cap plate, and a protective device on a bottom surface of the insulation plate and electrically connected to the electrode terminal and the negative electrode tab.

The rechargeable battery may further include an insulation gasket between the electrode terminal and the cap plate, where the insulation gasket is sized and shaped to fit the electrode terminal.

The rechargeable battery may further include a protective device inside the can and electrically connected to the electrode terminal and one of the negative electrode tab or the positive electrode tab.

The protective device may include a thermal fuse, a positive temperature coefficient element, or a bimetal.

The protective device may include the thermal fuse.

The rechargeable battery may further include a protective device inside the can and electrically connected to one of the negative electrode tab or the positive electrode tab, where the electrode terminal is electrically connected to an other of the negative electrode tab or the positive electrode tab.

The protective device may include a thermal fuse, a positive temperature coefficient element, or a bimetal.

The protective device may include the thermal fuse.

As described above, a rechargeable battery according to embodiments of the present invention can solve or lessen the problem associated with forming a protective device inside the battery (for example, to make the protective device more sensitive to a change in the internal temperature of the battery). Since the electrode terminal is formed at a location biased to one side of the center of the cap plate, it is possible to prevent or lessen the incompatibility of the rechargeable battery with existing charging/discharging equipment.

Additional aspects and/or features of the invention will be set forth in part in the description that follows and, in part, will be obvious from the description, or may be learned by practice of the invention.

BRIEF DESCRIPTION OF THE DRAWINGS

Features and aspects of the present invention will be more apparent from the following detailed description in conjunction with the accompanying drawings, in which.

DETAILED DESCRIPTION

Hereinafter, embodiments of the present invention will be described in detail with reference to the accompanying drawings.

Figure 1:
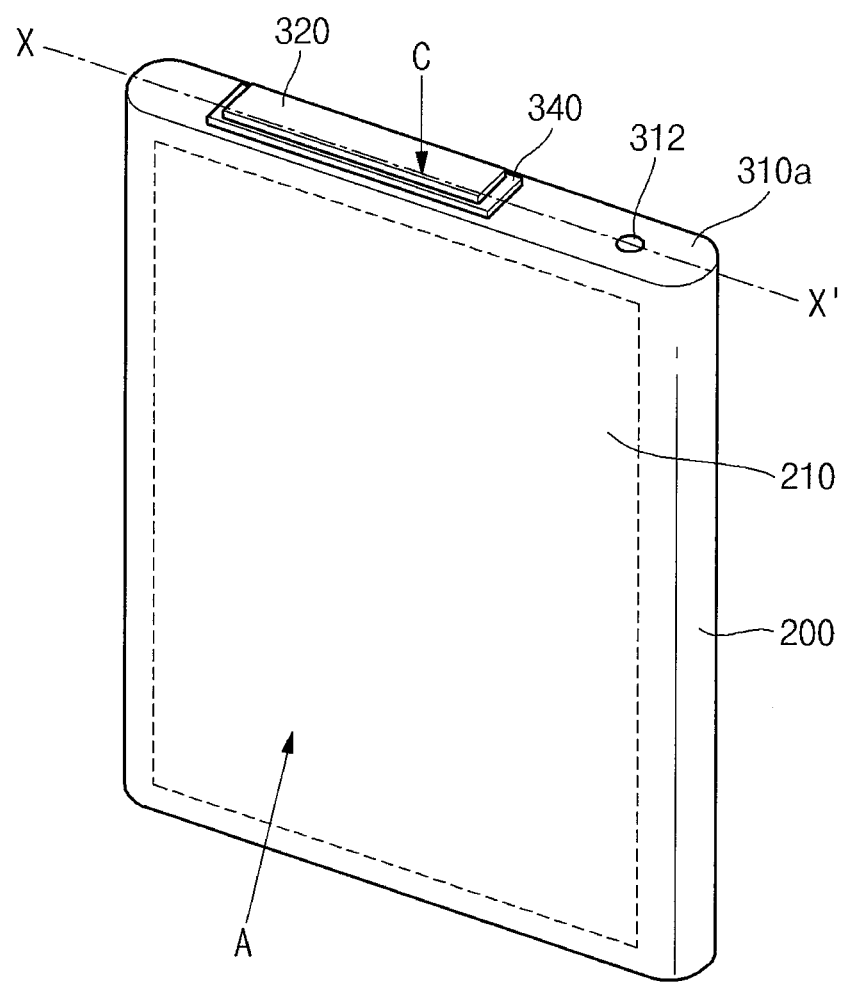
FIG. 1 is a perspective view illustrating a bare cell of a rechargeable battery according to an embodiment of the present invention.
Figure 3:
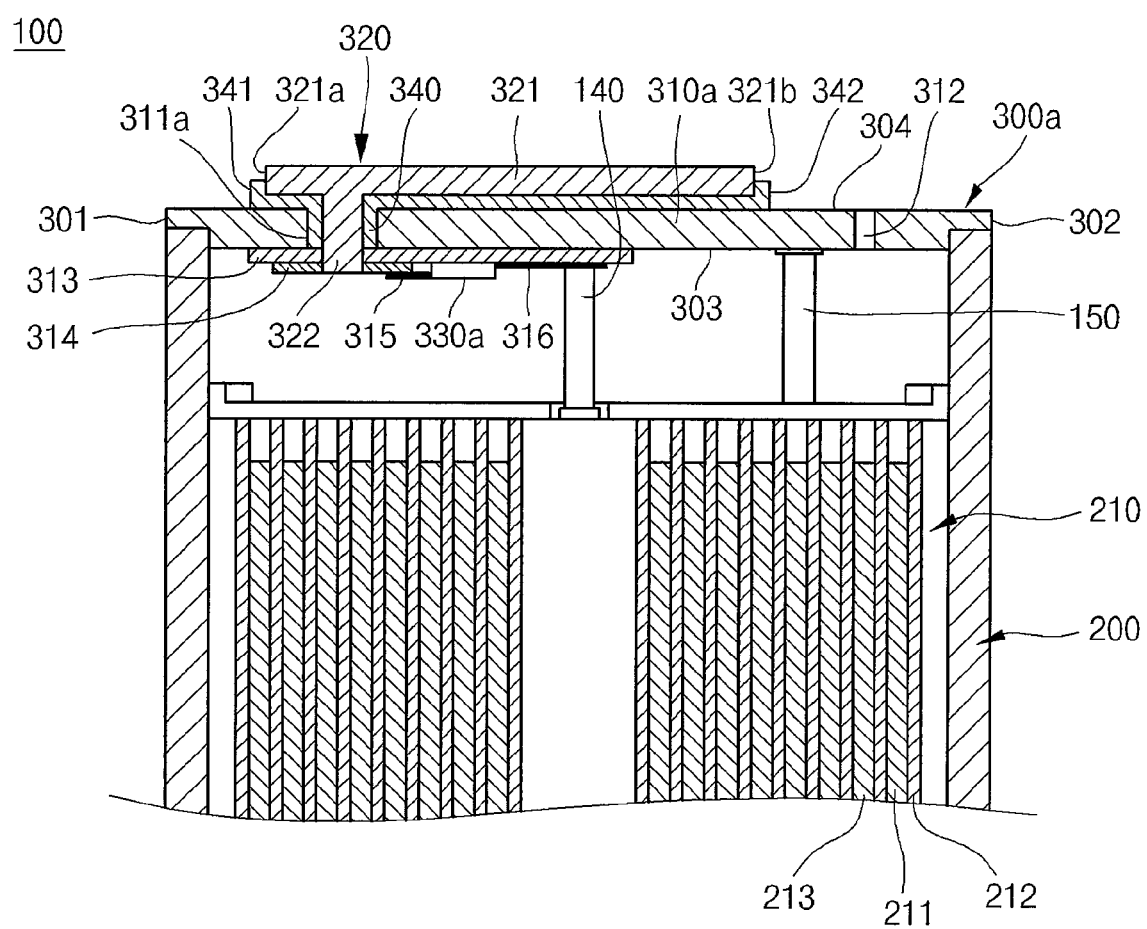
FIG. 3 is a sectional view taken along the line X-X' of FIG. 1, partially illustrating a bare cell of a rechargeable battery according to an embodiment of the present invention.

FIG. 1 is a perspective view illustrating a bare cell of a rechargeable battery according to an embodiment of the present invention. FIG. 3 is a sectional view taken along the line X-X' of FIG. 1, partially illustrating a bare cell 100 of a rechargeable battery according to an embodiment of the present invention.

Referring to FIGS. 1 and 3, the bare cell 100 of a rechargeable battery includes a can 200, an electrode assembly 210 housed (or accommodated) inside the can 200, and a cap assembly 300a sealing a top opening of the can 200. The can 200 may be made of a metallic member having substantially a rectangular parallelepiped shape and may serve as a terminal. A top end of the can 200 may be open, forming a top opening, and the electrode assembly 210 can be inserted into the top opening of the can 200.

Referring to FIG. 3, the electrode assembly 210 includes a positive electrode plate 211, a negative electrode plate 213, and a separator 212 for separating the positive electrode plate 211 from the negative electrode plate 213. The electrode assembly 210 can be produced, for example, by winding the positive electrode plate 211, the separator 212, the negative electrode plate 213, and another separator 212 into a jelly roll-type structure. The positive electrode plate 211 has a positive electrode tab 150 welded thereto, and one end of the positive electrode tab 150 protrudes upward from the electrode assembly 210.

The cap assembly 300a includes a cap plate 310a, an electrode terminal 320, and a protective device 330a. The cap plate 310a is made, for example, of a metal plate, sized and shaped to fit the top opening of the can 200 (to seal the top opening of the can 200). A terminal through-hole 311a is formed at a location (for example, a predetermined location) biased (for example, offset) to one side 301 from a center of the cap plate 310a (the center corresponding to a mid place between the one side 301 and an other side 302 of the cap plate 310a). The electrode terminal 320 can be inserted into the terminal through-hole 311a in a thickness direction of the cap plate 310a ranging from its top surface 304 to its bottom surface 303.

The electrode terminal 320, for example, a negative terminal, is inserted into the terminal through-hole 311a. An electrolyte injection hole 312 having a size (for example, a predetermined size) is formed at a location biased to the other side 302 from the center of the cap plate 310a. An electrolyte is injected in a thickness direction of the cap plate 310a through the electrolyte injection hole 312. A negative electrode tab 140 of the electrode assembly 210 is welded to the center of the bottom surface 303 of the cap plate 310a (with an insulation plate 313 therebetween), while the positive electrode tab 150 of the electrode assembly 210 is welded to the other side 302 of the cap plate 310a.

The electrode terminal 320 includes a head portion 321 exposed to the top surface of the cap plate 310a, and a pillar portion 322 inserted into the terminal through-hole 311a. In addition, an insulation gasket 340 is provided between the cap plate 310a and the electrode terminal 320 for electrical insulation therebetween. The insulation gasket 340 is sized and shaped to fit the electrode terminal 320.

Figure 2A:
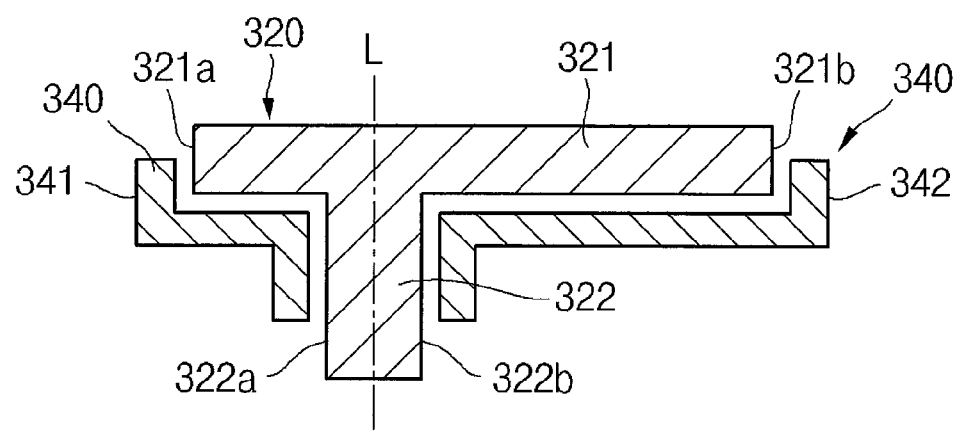
FIG. 2A is a partial sectional view of an electrode terminal and an insulation gasket, viewed from the direction 'A' of FIG. 1.
Figure 2B:
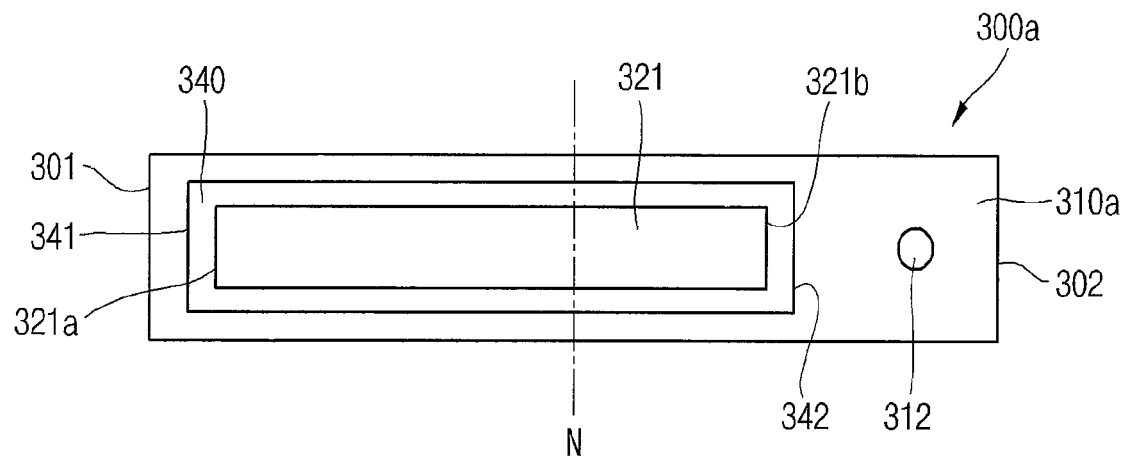
FIG. 2B is a top view viewed from the direction 'C' of FIG. 1.

FIGS. 2A and 2B are partial sectional views of the electrode terminal 320 and the insulation gasket 340, viewed from the directions 'A' and 'C', respectively, of FIG. 1.

Referring to FIG. 2A, when viewed from the front (in the direction 'A' of FIG. 1), the electrode terminal 320 is bilaterally asymmetrical with respect to a centerline L, the centerline L being equidistant from one side 322a and an other side 322b of the pillar portion 322, which is inserted into the terminal through-hole 311a. Thus, the electrode terminal 320 is constructed such that a distance ranging from one side 321a of the head portion 321 (upwardly protruding from the cap plate 310a) to the centerline L is shorter than a distance ranging from an other side 321b of the head portion 321 to the centerline L. In addition, the insulation gasket 340 is also shaped such that a distance ranging from one side 341 to the centerline L is shorter than a distance ranging from an other side 342 to the centerline L.

Referring to FIG. 2B, when viewed from the top (in the direction 'C' of FIG. 1), the electrode terminal 320 (of which the head portion 321 is shown in FIG. 2B) is constructed to pass a centerline N (of the cap plate 310a), the centerline N being equidistant from the one side 301 and the other side 302 of the cap plate 310a. That is, the other side 321b of the head portion 321 extends toward the other side 302 of the cap plate, so that the head portion 321 passes the center of the cap plate 310a.

In this case, the distance ranging from the one side 321a of the head portion 321 to the centerline N and the distance ranging from the other side 321b of the head portion 321 to the centerline N may be greater than a width of a portion of a charge/discharge plug that contacts the top surface of the head portion 321 of the electrode terminal 320 during a formation process (that is, coupling the charge/discharge plug to the top surface of the head portion). This is to help insure good contact of the charge/discharge plug and the electrode terminal 320. Here, the portion of the charge/discharge plug contacting the top surface of the head portion 321 is to be defined as a 'charge/discharge plug end' hereinafter. A purpose of the charge/discharge plug end is to safely connect the charge/discharge plug to the electrode terminal 320. The insulation gasket 340 is also constructed to pass the centerline N as described above.

Referring back to FIG. 3, a terminal plate 314 is electrically connected to the electrode terminal 320 (at the pillar portion 322) and is formed at a lower portion of a location biased toward the one side 301 of the cap plate 310a. The insulation plate 313 is formed between the bottom surface 303 of the cap plate 310a and the terminal plate 314 for electrically insulating the terminal plate 314 and the cap plate 310a. A polypropylene (PP) tape may be used, for example, as the insulation plate 313. In addition, the electrode terminal 320 may serve as a positive electrode terminal to then be connected to the positive electrode tab 150.

The protective device 330a is electrically connected to the terminal plate 314 by a first connection tab 315 on one side of the protective device 330a. This also electrically connects the protective device 330a to the electrode terminal 320 since the terminal plate is electrically connected to the electrode terminal 320. In addition, the first connection tab 315 also serves to attach the protective device 330a to a bottom surface of the insulation plate 313 that is positioned on the bottom surface 303 of the cap plate 310a. The protective device 330a is electrically connected to the negative electrode tab 140 by a second connection tab 316 at another side of the protective device. In other embodiments, the first connection tab 315 and the second connection tab 316 formed at the one side and the other side of the protective device 330a may be formed as a single element or integrally formed with the protective device 330a.

A thermal fuse, a PTC (Positive Temperature Coefficient) element, or a bimetal (for instance, a bimetallic strip) may be used, for example, as the protective device 330a. A thermal fuse, for example, which may be cheap and thermally sensitive, may be used as the protective device 330a in some embodiments.

The thermal fuse may be made of a tin (Sn) alloy containing tin as a main component. In order to increase thermal sensitivity, the thermal fuse may be formed of a thin film. Considering a generally acceptable range of operating temperatures and manufacturing processes, the thermal fuse may be, for example, designed to operate at a temperature between approximately 90° C. and approximately 100° C. That is, if the operating temperature is lower than 90° C., the thermal fuse may, for example, be melted in an aging process in manufacturing rechargeable batteries. On the other hand, if the operating temperature is higher than 100° C., the risk of explosion or the like due to overheating of a rechargeable battery may not be effectively prevented.

In an exemplary embodiment, a tin (Sn) alloy containing 70 to 90% of tin (Sn), 5 to 10% of zinc (Zn), 1 to 4% of lead (Pb), and the remainder of other metals may be used as the thermal fuse. In another embodiment, an alloy containing 22% of tin (Sn), 28% of lead (Pb), and 50% of bismuth (Bi) may be used as the thermal fuse.

The thermal fuse may be formed of a thin film. Since the thermal fuse is formed on the bottom surface 303 of the cap plate 310a, it may be damaged when it reacts with an electrolyte. To avoid this, a protective film made of polyethylene or polyurethane is preferably formed with such a thermal fuse.

In the foregoing disclosure, the electrode terminal 320 of the cap plate 310a is formed as a negative electrode terminal and the protective device 330a is connected between the negative electrode terminal and the negative electrode tab 140. In other embodiments, the electrode terminal 320 of the cap plate 310a may be formed as a positive electrode terminal and the protective device 330a may be connected between the positive electrode terminal and the positive electrode tab 150.

A rechargeable battery according to another embodiment of the present invention will now be described.

Figure 4:
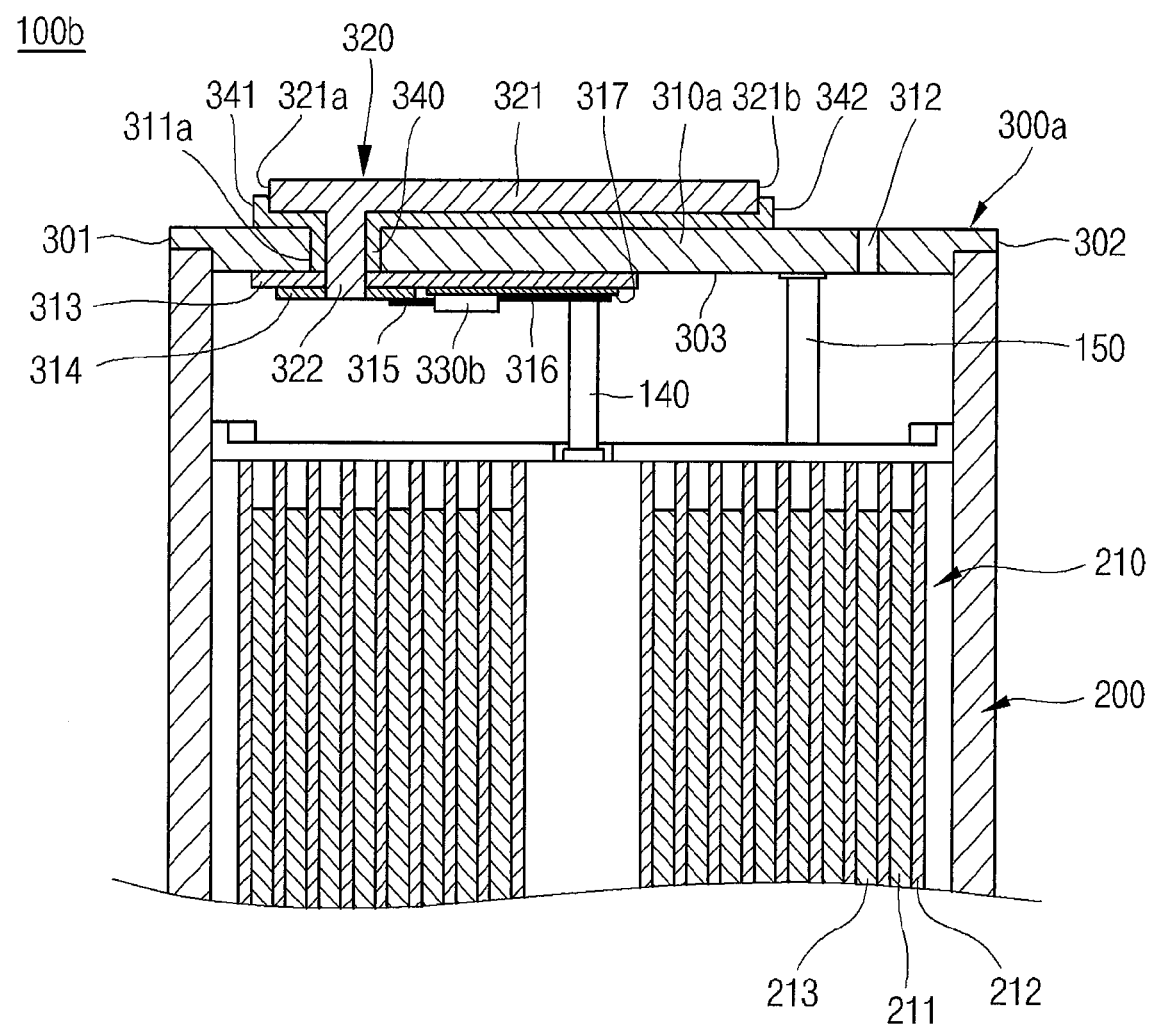
FIG. 4 is a sectional view taken along the line X-X' of FIG. 1, partially illustrating a bare cell of a rechargeable battery according to another embodiment of the present invention.

FIG. 4 is a sectional view taken along the line X-X' of FIG. 1, partially illustrating a bare cell 100b of a rechargeable battery according to another embodiment of the present invention, the bare cell 100b of FIG. 4 corresponding to a portion shown for the bare cell 100 in FIG. 3.

The rechargeable battery shown in FIG. 4 is substantially the same as that shown in FIG. 3 in view of configuration and functions, except that a heat blocking plate 317 is further provided in the rechargeable battery according to the embodiment shown in FIG. 4. Thus, a detailed explanation of similar elements or functions will not be repeated, and the illustrated embodiment of FIG. 4 will be discussed primarily with regard to the heat blocking plate 317 in the following description.

Referring to FIG. 4, the heat blocking plate 317 is formed between an insulation plate 313 and a protective device 330b using, for example, a polyurethane-based adhesive resin. The heat blocking plate 317 made of such a polyurethane-based adhesive resin can reinforce a tensile strength of the protective device 330b while preventing a thermal fuse from malfunctioning when an external temperature of the battery is transferred to a thermal fuse used as the protective device 330b.

A similar idea can also be applied to the bare cell 100 of FIG. 3. That is, the insulation plate 313 for fixing the protective device 330a may be made of a polyurethane resin, instead of a PP tape, thereby performing both an insulating function and a heat blocking function using only the insulation plate 313.

A rechargeable battery according to yet another embodiment of the present invention will now be described.

Figure 5:
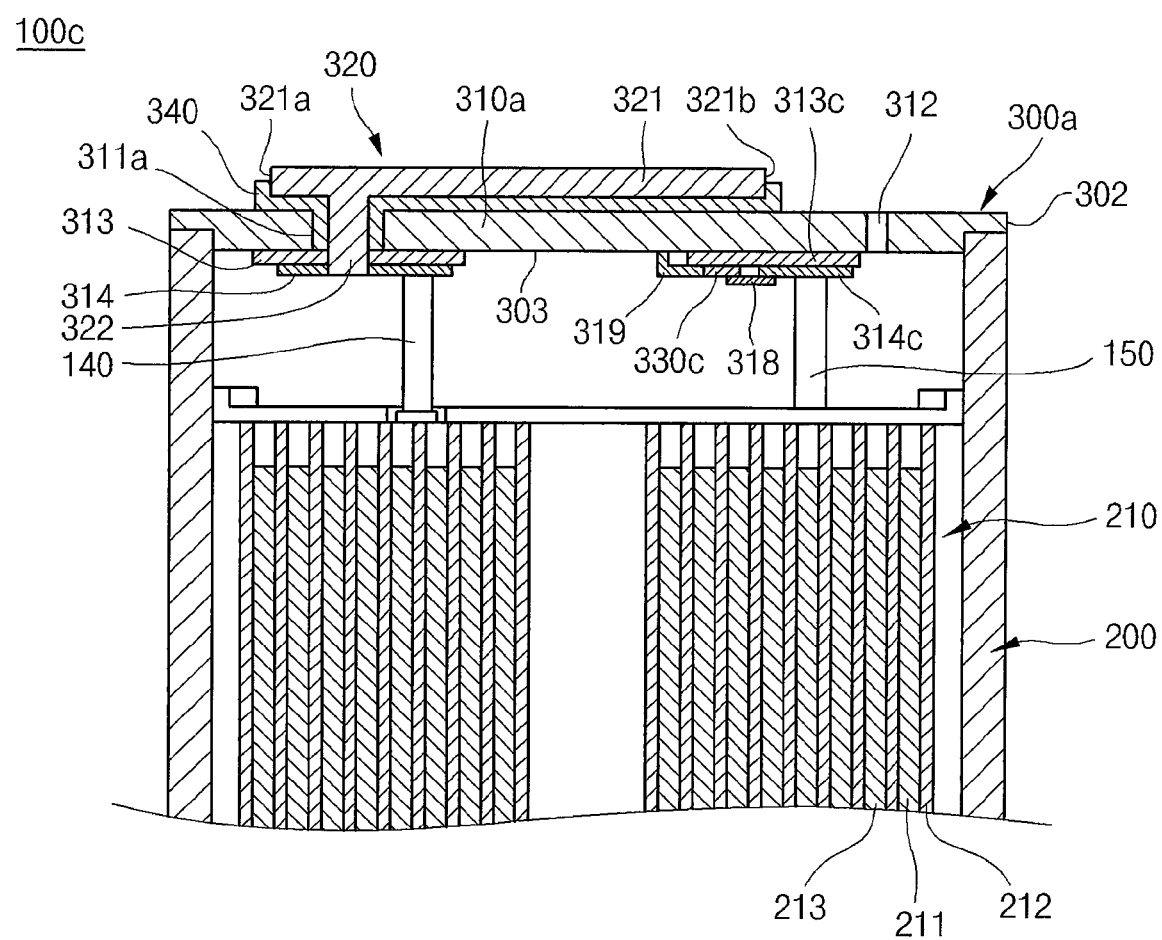
FIG. 5 is a sectional view taken along the line X-X' of FIG. 1, partially illustrating a bare cell of a rechargeable battery according to yet another embodiment of the present invention.

FIG. 5 is a sectional view taken along the line X-X' of FIG. 1, partially illustrating a bare cell 100c of a rechargeable battery according to yet another embodiment of the present invention.

The rechargeable battery shown in FIG. 5 is substantially the same as that shown in FIG. 3 in view of configuration and functions, except that a formation location of a protective device 330c is different from that of the protective device 330a of the embodiment shown in FIG. 3. In addition, a second insulation plate 313c and a second terminal plate 314c are further provided in the rechargeable battery according to the embodiment shown in FIG. 5. Thus, a detailed explanation of similar elements or functions will not be repeated, and in the following description, the illustrated embodiment will be discussed primarily with regard to the differences between the two embodiments.

Referring to FIG. 5, the protective device 330c may be provided between (or electrically connected to) a positive electrode tab 150 and a cap plate 310a. That is, the second insulation plate 313c is formed at a location biased to the other side 302 of the cap plate 310a with respect to the center of a bottom surface 303 of the cap plate 310a. The second terminal plate 314c is formed between the second insulation plate 313c and the positive electrode tab 150.

In addition, the positive electrode tab 150 is connected to the second terminal plate 314c, and the protective device 330c is connected to the cap plate 310a by a fourth connection tab 319 formed at one side of the protective device 330c. Further, the second terminal plate 314c is connected to a third connection tab 318 formed at an other side of the protective device 330c. Thus, a current flows from the positive electrode tab 150 to the cap plate 310a through the protective device 330c without flowing directly. In addition, in other embodiments, the electrode terminal 320 of the cap plate 310a may serve as a positive electrode terminal, and the protective device 330c may be provided between the negative electrode tab 140 and the cap plate 310a.

A rechargeable battery according to still another embodiment of the present invention will now be described.

Figure 6:
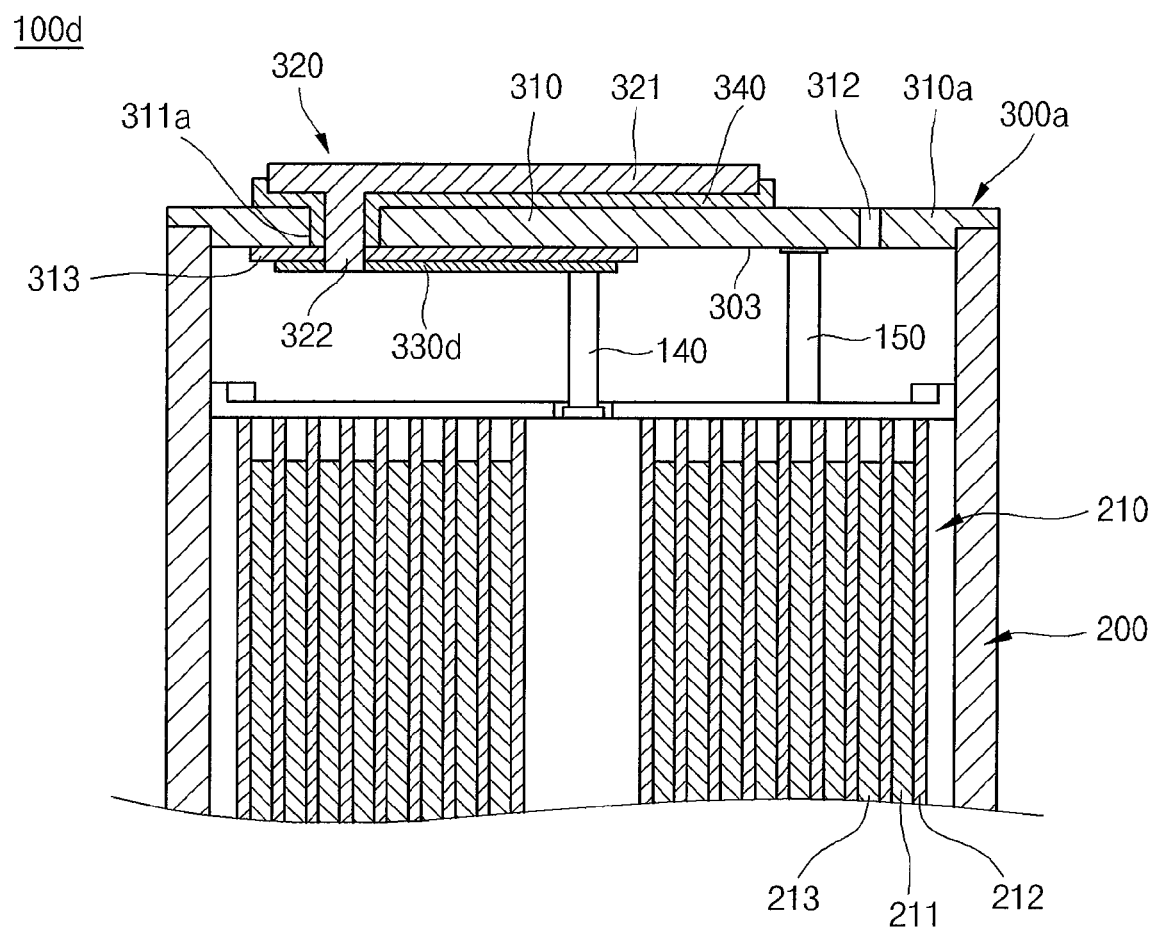
FIG. 6 is a sectional view taken along the line X-X' of FIG. 1, partially illustrating a bare cell of a rechargeable battery according to still another embodiment of the present invention.

FIG. 6 is a sectional view taken along the line X-X' of FIG. 1, partially illustrating a bare cell 100d of a rechargeable battery according to still another embodiment of the present invention, the bare cell 100d of FIG. 6 corresponding to a portion of the bare cell 100 shown in FIG. 3.

The rechargeable battery shown in FIG. 6 is substantially the same as that shown in FIG. 3 in view of configuration and functions, except that a protective device 330d is integrally formed with a terminal plate (see, for example, the terminal plate 314 in FIG. 3), thereby producing a combined terminal plate/protective device 330d in FIG. 6. Thus, a detailed explanation of similar elements or functions between the two embodiments will not be repeated, and in the following description, the illustrated embodiment will be discussed primarily with regard to the protective device 330d integrally formed with a terminal plate.

Referring to FIG. 6, unlike in FIG. 3 (in which the terminal plate 314 and the protective device 330a are separately formed on the bottom surface 303 of the insulation plate 313), an electrode terminal 320 and a negative electrode tab 140 are electrically connected using a protective device 330d, instead of also using a terminal plate (see, for example, the terminal plate 314 of FIG. 3) to connect the electrode terminal 320 and the negative electrode tab 140 to each other. Thus, a separate terminal plate is not necessary, thereby simplifying a cap assembly. In addition, the electrode terminal 320 may serve as a positive electrode plate, rather than as a negative electrode plate.

Although the present invention has been described with reference to the certain exemplary embodiments, the foregoing disclosure should be interpreted as illustrative only and it should be understood that various modifications and variations can be easily made by those skilled in the art without departing from the spirit or scope of the invention as defined in the following claims, and equivalents thereof.

What is claimed is:

1. A rechargeable battery comprising:
   an electrode assembly comprising a positive electrode tab and a negative electrode tab;
   a can accommodating the electrode assembly in an interior of the battery;
   a protective device inside the can and electrically connected to one of the positive electrode tab and the negative electrode tab;
   a cap plate sealing a top opening of the can and having a terminal through-hole at a first location offset toward one side of the cap plate with respect to a center of the cap plate and to the protective device under the cap plate; and
   a one-piece electrode terminal having a pillar portion inserted through the terminal through-hole at the first location into the interior of the battery and a head portion extending along a top surface of the cap plate from the first location to past the center of the cap plate and past the protective device.

2. The rechargeable battery of claim 1, further comprising:
   a terminal plate below the first location and electrically connected to the electrode terminal; and
   an insulation plate between a bottom surface of the cap plate and the terminal plate.

3. The rechargeable battery of claim 2, wherein
   the protective device is attached to a bottom surface of the insulation plate,
   one side of the protective device is electrically connected to the terminal plate by a first connection tab, and
   another side of the protective device is electrically connected to the negative electrode tab by a second connection tab.

4. The rechargeable battery of claim 3, further comprising a heat blocking plate between the insulation plate and the protective device.

5. The rechargeable battery of claim 2, further comprising:
   a second insulation plate on the bottom surface of the cap plate and below a second location of the cap plate, the second location being offset toward another side of the cap plate with respect to the center of the cap plate, the center of the cap plate being between the first location and the second location, and
   a second terminal plate on a bottom surface of the second insulation plate.

6. The rechargeable battery of claim 5, wherein
   the protective device is on the bottom surface of the second insulation plate,
   one side of the protective device is electrically connected to the bottom surface of the cap plate by a first connection tab,
   another side of the protective device is electrically connected to the second terminal plate by a second connection tab, and
   the second terminal plate is electrically connected to the positive electrode tab.

7. The rechargeable battery of claim 1, further comprising an insulation plate below the first location and on a bottom surface of the cap plate, wherein the protective device is on a bottom surface of the insulation plate and electrically connected to the electrode terminal and the negative electrode tab.

8. The rechargeable battery of claim 1, further comprising an insulation gasket between the electrode terminal and the cap plate, wherein the insulation gasket is sized and shaped to fit the electrode terminal.

9. The rechargeable battery of claim 1, wherein the protective device is electrically connected to the electrode terminal.

10. The rechargeable battery of claim 9, wherein the protective device comprises a thermal fuse, a positive temperature coefficient element, or a bimetal.

11. The rechargeable battery of claim 10, wherein the protective device comprises the thermal fuse.

12. The rechargeable battery of claim 1, wherein the electrode terminal is electrically connected to another of the negative electrode tab or the positive electrode tab.

13. The rechargeable battery of claim 12, wherein the protective device comprises a thermal fuse, a positive temperature coefficient element, or a bimetal.

14. The rechargeable battery of claim 13, wherein the protective device comprises the thermal fuse.

15. The rechargeable battery of claim 1, wherein the electrode terminal asymmetrically extends from the terminal through-hole.

* * * * *